US008881267B2

(12) United States Patent  
Gillespie (10) Patent No.: US 8,881,267 B2
(45) Date of Patent: Nov. 4, 2014

(54) SYSTEMS AND METHODS FOR SUPPORTING PRE-BOOT LOG IN (75) Inventor: Kurt David Gillespie, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 360 days.

(21) Appl. No.: 12/993,503

(22) PCT Filed: May 19, 2008

(86) PCT No.: PCT/US2008/064085
§ 371 (c)(1),
(2), (4) Date: Nov. 19, 2010

(87) PCT Pub. No.: WO2009/142618
PCT Pub. Date: Nov. 26, 2009

(65) Prior Publication Data
US 2011/0072511 A1  Mar. 24, 2011

(51) Int. Cl.
*G06F 21/00* (2013.01)
*G06F 21/46* (2013.01)
*G06F 3/023* (2006.01)
*G06F 21/57* (2013.01)
*G06F 21/31* (2013.01)

(52) U.S. Cl.
CPC ............... *G06F 21/46* (2013.01); *G06F 3/023* (2013.01); *G06F 21/575* (2013.01); *G06F 21/31* (2013.01); *G06F 21/57* (2013.01)
USPC .............................................. 726/19; 726/17

(58) Field of Classification Search
USPC .......................................... 726/17–19, 26–30
See application file for complete search history.

(56) References Cited

U.S. PATENT DOCUMENTS

| 6,237,100 | B1 * | 5/2001 | Cromer et al. ................ 713/300 |
| 6,823,463 | B1 | 11/2004 | Challener et al. |
| 6,996,641 | B2 | 2/2006 | Rothman |
| 2002/0054120 | A1 * | 5/2002 | Kawano et al. ............... 345/773 |
| 2002/0196274 | A1 * | 12/2002 | Comfort et al. ............... 345/741 |
| 2003/0107600 | A1 | 6/2003 | Kwong et al. |
| 2004/0010722 | A1 * | 1/2004 | Ha ................................ 713/202 |
| 2005/0228993 | A1 * | 10/2005 | Silvester et al. .............. 713/168 |

(Continued)

FOREIGN PATENT DOCUMENTS

| CN | 1529247 A | 9/2004 |
| CN | 1591363 A | 3/2005 |

(Continued)

OTHER PUBLICATIONS

International Searching Authority, International Search Report and Written Opinion dated Feb. 6, 2009, pp. 10.

(Continued)

*Primary Examiner* — Eleni Shiferaw
*Assistant Examiner* — Hilary Branske (57) ABSTRACT

A method for supporting pre-boot log in is described herein. The method includes receiving a password, via an operating system of the computer system, selected by a user for use in a pre-boot log in. The method includes determining whether the password can be entered by the user prior to completion of booting of the computer system. If the password cannot be entered by the user prior to completion of the booting, the method includes signaling that the password is unacceptable.

15 Claims, 6 Drawing Sheets

(56) References Cited

U.S. PATENT DOCUMENTS

| | | |
|---|---|---|
| 2007/0101117 A1 | 5/2007 | Piwonka et al. |
| 2008/0177920 A1* | 7/2008 | Dennis ............. 710/200 |
| 2009/0064318 A1* | 3/2009 | Guo ................. 726/19 |
| 2009/0217389 A1* | 8/2009 | Estroff et al. ....... 726/34 |

FOREIGN PATENT DOCUMENTS

| | | |
|---|---|---|
| CN | 1602464 | 3/2005 |
| CN | 101093525 | 12/2007 |
| JP | 1996-087367 | 4/1996 |
| JP | 1997-297725 | 11/1997 |
| JP | 2000-056927 | 2/2000 |
| JP | 2002-007332 | 2/2002 |
| JP | 2002-041223 | 2/2002 |
| JP | 2005-011381 | 1/2005 |
| JP | 2006-243957 | 9/2006 |
| JP | 2006-344113 | 12/2006 |
| JP | 2007-272662 | 10/2007 |
| KR | 10-2004-0062679 | 7/2004 |
| WO | WO-0177792 | 10/2001 |
| WO | WO-02091201 | 11/2002 |

OTHER PUBLICATIONS

Toshiba; "Setting a BIOS password may result in the notebook not being able to start anymore"; Document ID: TSB4B009N0006R01; URL: http://aps2.toshiba-tro.de/kb0/TSB4B009N0006R01.htm; retrieved on Feb. 7, 2013.

Combined Search and Exmination Report Under Sections 17 and 18(4) recieved in GB Application No. 1211243.9, mailed on Jul. 9, 2012, 5 pgs.

Examination Report Under Section 18(3) received in related GB Application No. 1019584.0, mailed on Mar. 8, 2012, 3pgs.

* cited by examiner

SYSTEMS AND METHODS FOR SUPPORTING PRE-BOOT LOG IN

BACKGROUND

It is now common to require a user to log in before being able to operate a computer. Such a log in is normally performed within the operating system environment. That is, the log in is performed after the computer has booted and the operating system is running. Therefore, it is the operating system, or a program running within the operating system environment, that controls the log in and authenticates the user.

Recently, it has been proposed to conduct security log ins before the computer is booted under the control of the basic input/output system (BIOS). By performing the log in during the pre-boot stage, unauthorized users can be barred from accessing not only the operating system but the computer's hardware, such as the hard drive. Although pre-boot log in is attractive, there are challenges associated with its implementation. For example, Unicode passwords that may be usable in the operating system environment may not be fully supported in the BIOS environment. Specifically, if the characters of the password cannot be directly entered by the user using a physical keyboard, the password cannot be entered by the user in the BIOS environment. In such a case, the computer will not boot and potentially could be rendered non-functional.

BRIEF DESCRIPTION OF THE DRAWINGS

The disclosed systems and methods can be better understood with reference to the following drawings. The components in the drawings are not necessarily to scale.

FIG. 1 a block diagram of an embodiment of a computer system configured to support pre-boot log in.

FIGS. 2A and 2B present a flow diagram that illustrates an embodiment of a method for supporting pre-boot log in.

DETAILED DESCRIPTION

As described above, if an authorized user cannot enter in the BIOS environment a password selected within the operating system environment, the user will be barred from booting the computer system if a pre-boot log in is required. As described below, such a situation can be avoided by confirming at the time of password selection that the password can in fact be directly entered with the user's keyboard. In some embodiments, a virtual or "soft" keyboard may also be displayed for the user to account for situations in which the presumed keyboard layout does not match the user's actual keyboard layout.

Figure 1:
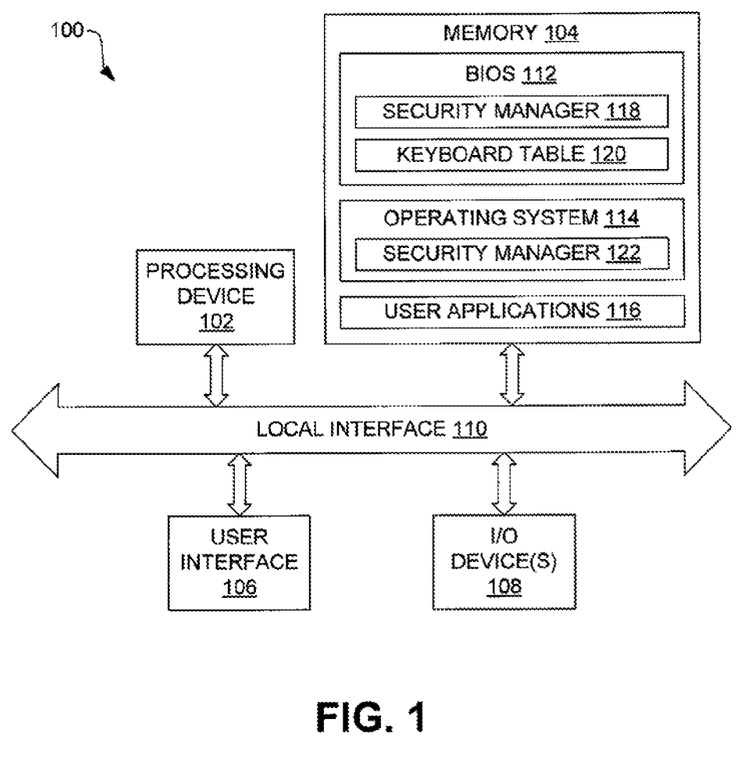

Referring to the drawings, in which like numerals identify corresponding parts throughout the several views, FIG. 1 illustrates an example computer system 100 that supports pre-boot log in. As used herein, the term "pre-boot log in" identifies a log in procedure that is performed under the control of the BIOS before the computer system has completed booting and before the operating system is up and running.

The computer system 100 can have any one of a number of different configurations. For example, the system 100 can be configured as a desktop computer, a notebook computer, a server computer, or a handheld computing device, to name a few. Regardless, in the embodiment of FIG. 1 the computer system 100 comprises a processing device 102, memory 104, a user interface 106, and at least one I/O device 108, each of which is connected to a local interface 110. The processing device 102 can comprise a central processing unit (CPU) or a semiconductor-based microprocessor that executes commands stored in memory 104. The memory 104 includes any one of or a combination of volatile memory elements (e.g., RAM modules) and nonvolatile memory elements (e.g., hard disk, ROM modules, etc.).

The user interface 106 comprises the components with which the user interacts with the computer system 100. The user interface 106 may comprise, for example, a keyboard, mouse, and a display, such as a liquid crystal display (LCD). The one or more I/O devices 108 are adapted to facilitate communications with other devices and may include one or more communication components, such as a modulator/demodulator (e.g., modem), a wireless device (e.g., RF transceiver), a network card, and the like.

The memory 104 comprises various programs (i.e., logic) including a BIOS 112, an operating system 114, and one or more user applications 116 that are adapted to run within the operating system environment. The BIOS 112 generally functions to boot the computer system 100 and enable other programs, such as the operating system 114, to assume control of the system. As indicated in FIG. 1, the BIOS 112 includes a security manager 118 that, as described in greater detail below, supports pre-boot log in on the computer system 100. In some embodiments, the security manager 118 operates in cooperation with a security manager 122 of the operating system 114 to ensure that passwords selected by the user for the pre-boot log in process are acceptable. In some embodiments, that determination is made by the BIOS security manager 118 with reference to a keyboard layout table 120 of the BIOS 112. As is also described below, the BIOS security manager 118 can, in some embodiments, display a virtual or soft keyboard to the user to enable the user to communicate his or her password in cases in which a mismatch between a keyboard layout presumed by the BIOS security manager 118 does not match the user's actual physical keyboard layout or regional variation.

Figure 2A:
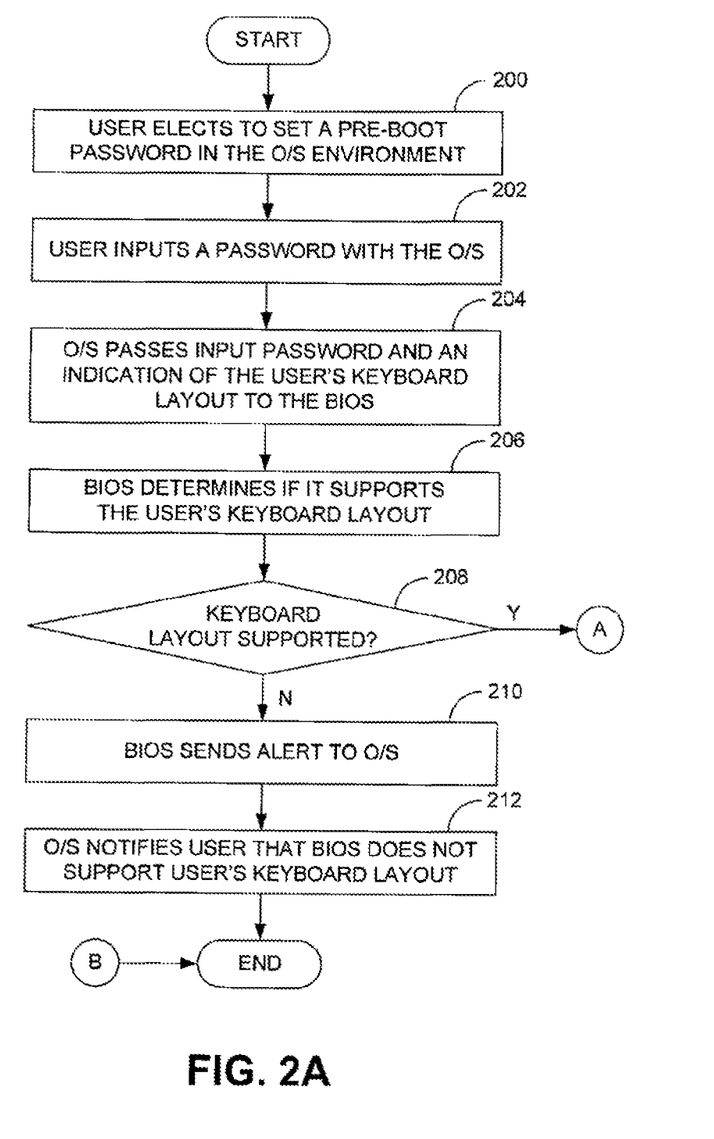

FIGS. 2A and 2B illustrate an example method for supporting pre-boot log in. Beginning with block 200 of FIG. 2A, a user elects to set a pre-boot password while in the operating system environment. By way of example, the user may be establishing, for the first time, that a password that will be required by the BIOS 112 before the user's computer system 100 will boot. Alternatively, the user may be changing an existing pre-boot log in password. In either case, the user inputs a password with the operating system 114, as indicated in block 202, for example using an operating system "wizard" or similar utility. The user may input the password using a variety of methods. For instance, the user may simply type in a password. Alternatively, the user may copy a password from a given source (e.g., document, web page, etc.) and paste it into a input block presented by the operating system.

Referring next to block 204, once the password has been input, the operating system 114 passes the password along with an indication of the user's keyboard layout to the BIOS 112. With that information, the BIOS 112 can, as indicated in block 206, determine whether the BIOS supports the user's keyboard layout. That is, the BIOS 112 can determine whether the BIOS 112 stores a description of the layout of the user's physical keyboard, for example in its keyboard layout table 120. An example of difference in keyboard layout is the difference between a Spanish keyboard, which may need the "ñ" character, and the English keyboard, which does not use that character. Accordingly, two different keyboards can have different characters, shared characters in different physical locations, and/or a different number of keys, each resulting in a different way of typing for the end user. With reference to decision block 208, if the keyboard layout is supported, flow proceeds on to block 214 of FIG. 2B. If, on the other hand, the keyboard layout is not supported by the BIOS 112, flow continues to block 210 at which the BIOS sends an alert to the operating system 114 to notify the operating system that the user's keyboard layout is not supported. The operating system 114 can, in turn, notify the user of that fact, as indicated in block 212. At that point, the user can either change his or her keyboard layout and reattempt password selection, or simply elect not to use the pre-boot.log in feature.

Figure 2B:
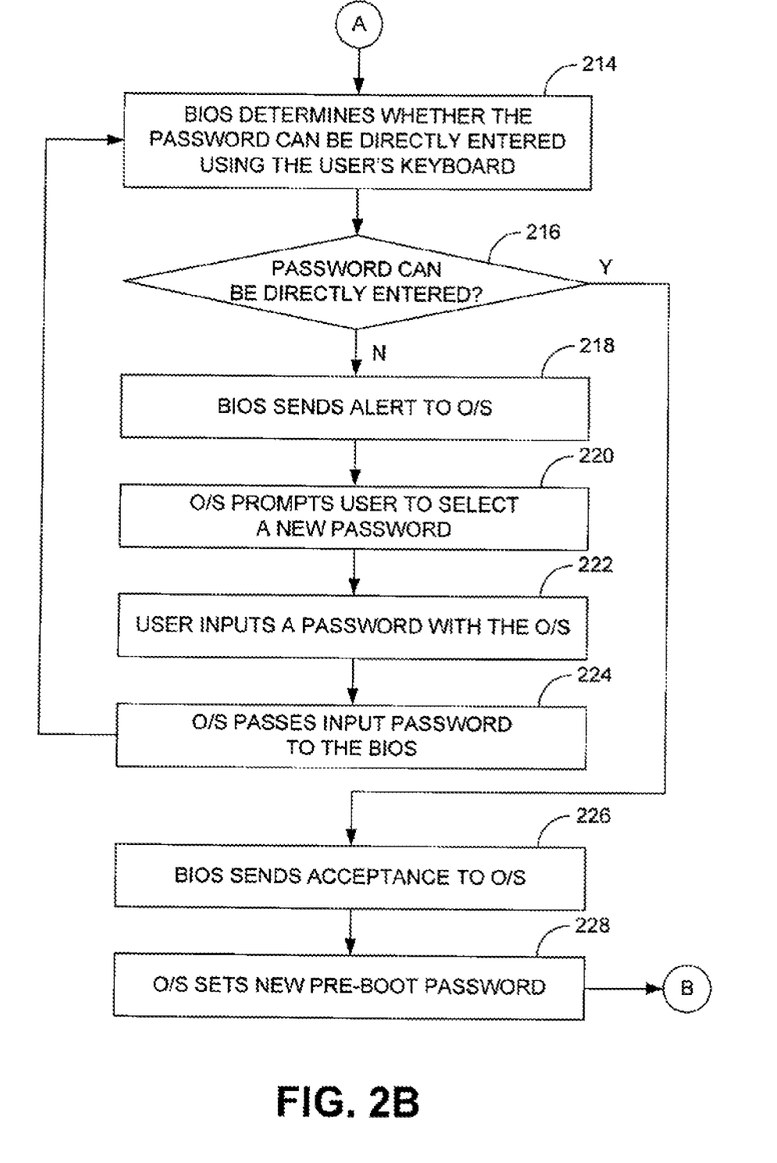

Assuming that the BIOS 112 supports the user's keyboard layout, the BIOS then determines whether the password input by the user can be directly entered using the user's keyboard, as indicated in block 214 of FIG. 2B. In particular, it is determined whether each character of the password can be directly input (i.e., typed) through the selection of one or multiple keyboard keys of the designated keyboard layout, as opposed to being indirectly input. An example of indirect input includes the use of a copy/paste function in which the individual characters of the pasted character or character string is not actually typed but instead copied from a separate source, which will be unavailable in the BIOS environment. A further example of indirect input includes selection of a character or symbol (e.g., Chinese word or phrase) presented to the user after input of one or more of keyboard keys that trigger such presentation. In that situation, the character or symbol is also not actually typed by the user, and such functionality will also be unavailable in BIOS environment. Accordingly, it is determined whether each character is one that can be typed by the user and recognized by the BIOS 112. Notably, while the operating system 114 may be configured to recognize thousands or even tens of thousands of Unicode characters, the capabilities of the BIOS 112 may be far more limited. An example of a character that could be rejected is a Chinese character when the user is using an English (e.g., U.S.) keyboard because such a keyboard would not be able to product that character.

With reference next to decision block 216, assuming that all of the characters of the password can be directly entered using the keyboard, and therefore recognized by the BIOS 112, flow continues down to block 226 described below. If, however, one or more of those characters cannot be directly input using the keyboard, flow continues to block 218 at which the BIOS 112 sends an alert to the operating system 114 that conveys that the password is unacceptable for use in pre-boot log in. The operating system 114 can then prompt the user to select a new password, as indicated in block 220. Optionally, the operating system can further identify the reason why the previous password was unacceptable and can further request the user to select a password whose characters can be directly entered (i.e., typed) using the user's keyboard.

If the user wishes to make a further attempt at setting a password, the user can input a further password with the operating system 114, as indicated in block 222, and the operating system can again pass the password to the BIOS 112, as indicated in block 224. Flow can then return to block 214, at which the BIOS 112 again considers the password. Assuming that the new password selected by the user is acceptable, flow continues to block 226 at which the BIOS 112 sends an acceptance to the operating system 114. Once that acceptance is received, the operating system 114 can set the new pre-boot password, as indicated in block 228, so that a pre-boot log in can be performed next time the computer system 100 is initiated.

Figure 3A:
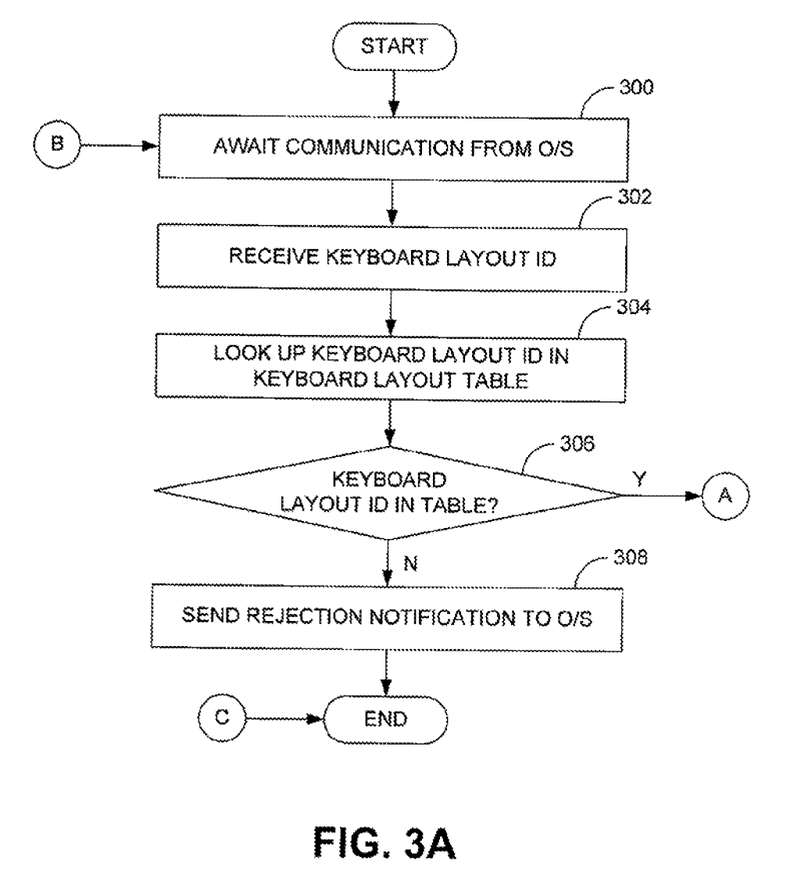
FIGS. 3A and 3B present a flow diagram that illustrates a first embodiment of operation of a BIOS security manager shown in FIG. 1.

FIGS. 3A and 3B illustrate an example of operation of the BIOS security manager 118 (FIG. 1) in supporting pre-boot log in. Beginning with block 300 of FIG. 3A, the BIOS security manager 118 awaits a communication from the operating system 114, for example from the operating system security manager 122. At block 302, the BIOS security manager 118 receives a keyboard layout ID from the operating system 114. By way of example, that ID is presented to the BIOS security manager 118 as a part of a pre-boot log in set up procedure performed by the user within the operating system environment. The BIOS security manager 118 then looks up the keyboard layout ID in the keyboard layout table 120, as indicated in block 304, to determine whether or not the user's keyboard layout is supported by the BIOS 112. With reference to decision block 306, if the keyboard layout ID is not in the table 120, the BIOS security manager 118 sends a rejection notification to the operating system 114, as indicated in block 308, and flow for the session is terminated given that pre-boot log in is not possible with the user's current keyboard layout.

Figure 3B:
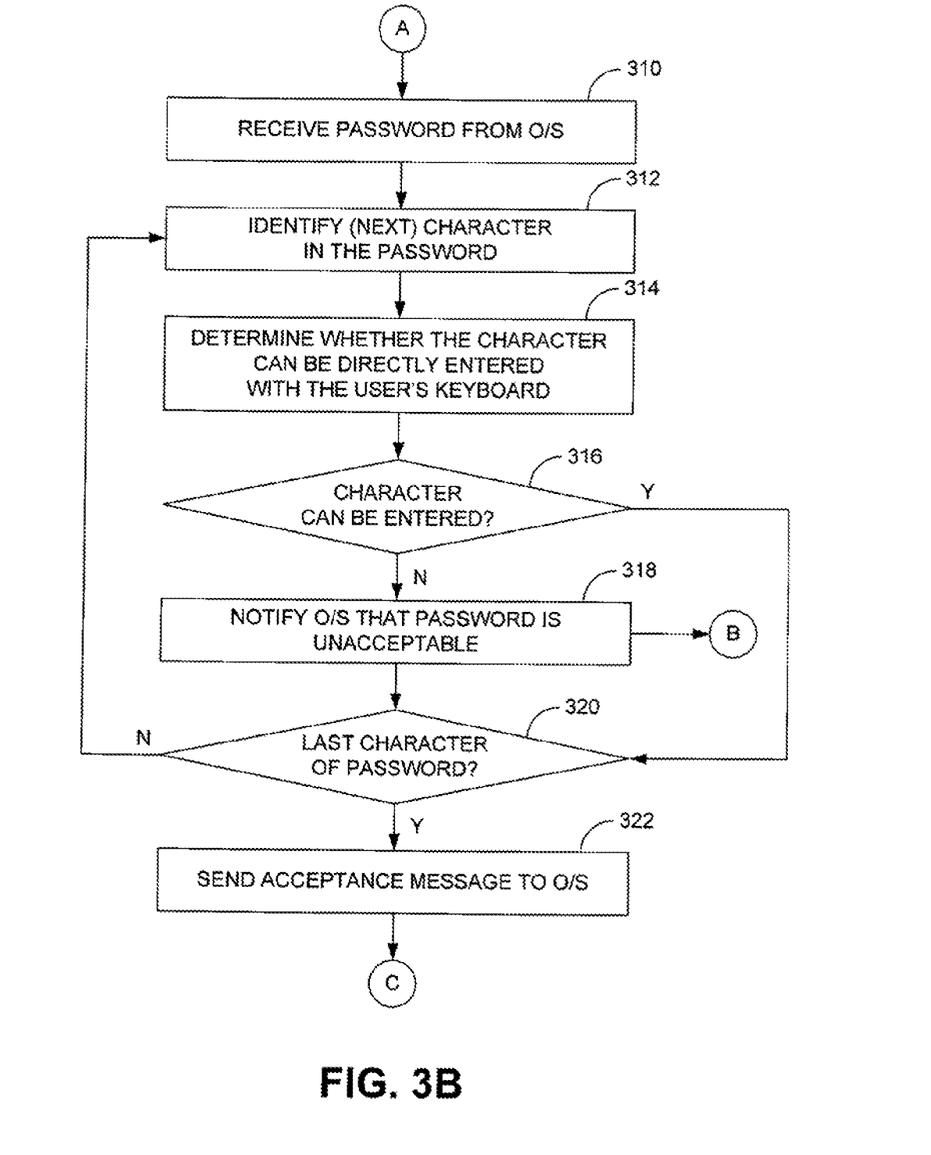

With further reference decision block 306, if the keyboard layout ID is in the keyboard table 120, meaning that the BIOS 112 supports that layout, flow continues to block 310 at which the BIOS security manager 118 receives the password selected by the user from the operating system 114. Although the receipt of the password has been described as being separate from receipt of the keyboard layout ID, it is noted that both pieces of information can be provided to and received by the BIOS security manager 118 simultaneously. Regardless, once the BIOS security manager 118 has received the password, the BIOS security manager identifies a character of the password, as indicated in block 312. Then, with reference to block 314, the BIOS security manager 118 determines whether that character can be directly entered with the user's keyboard. In particular, it is determined whether the character can be directly typed with the keyboard through the selection of a single key or simultaneous selection of multiple keys, including, for example, the "shift," "ctrl," and "alt" keys. Referring to decision block 316, if the character can be directly entered, flow continues down to decision block 320 at which it is determined whether that character was the last character of the password. If not, flow returns to block 312 at which the next character of the password is considered. If, however, the character cannot be entered, flow continues to block 318 at which the operating system 114 is notified that the password is unacceptable. Flow can then return back to block 300 of FIG. 3A at which the BIOS security manager 118 awaits a further communication from the operating system.

Returning to decision block 320, if each character of the password is acceptable, flow continues to block 322 at which the BIOS security manager 118 sends an acceptance message to the operating system 114 indicating that the user's selected password is acceptable for the pre-boot log in process.

Through the process described above in relation to FIGS. 2 and 3, steps are taken to ensure that the user's selected password can be received and recognized by the BIOS 112 during pre-boot log in. However, if for some reason there is a disconnect between what the BIOS 112 thinks is the user's keyboard layout and the user's actual keyboard layout, the user can be denied access to the computer system 100 even when he or she enters what he or she believes to be the correct password. Consider an example in which the user sets his pre-boot password while using the standard English keyboard layout. In such a case, the BIOS will be notified that the user is using the standard English keyboard layout and will therefore interpret keystrokes accordingly. If, however, the user were to change his or her keyboard layout thereafter, mismatch may occur that can result in the BIOS interpreting a valid password as an invalid password. For instance, if the user changed his or her keyboard layout to the standard French keyboard layout, the physical location of the "q" and "a" keys are reversed. Therefore, if the user's password were "quark123," the BIOS would interpret the user's input as "auqrk123" and would deny the user access.

Figure 4:
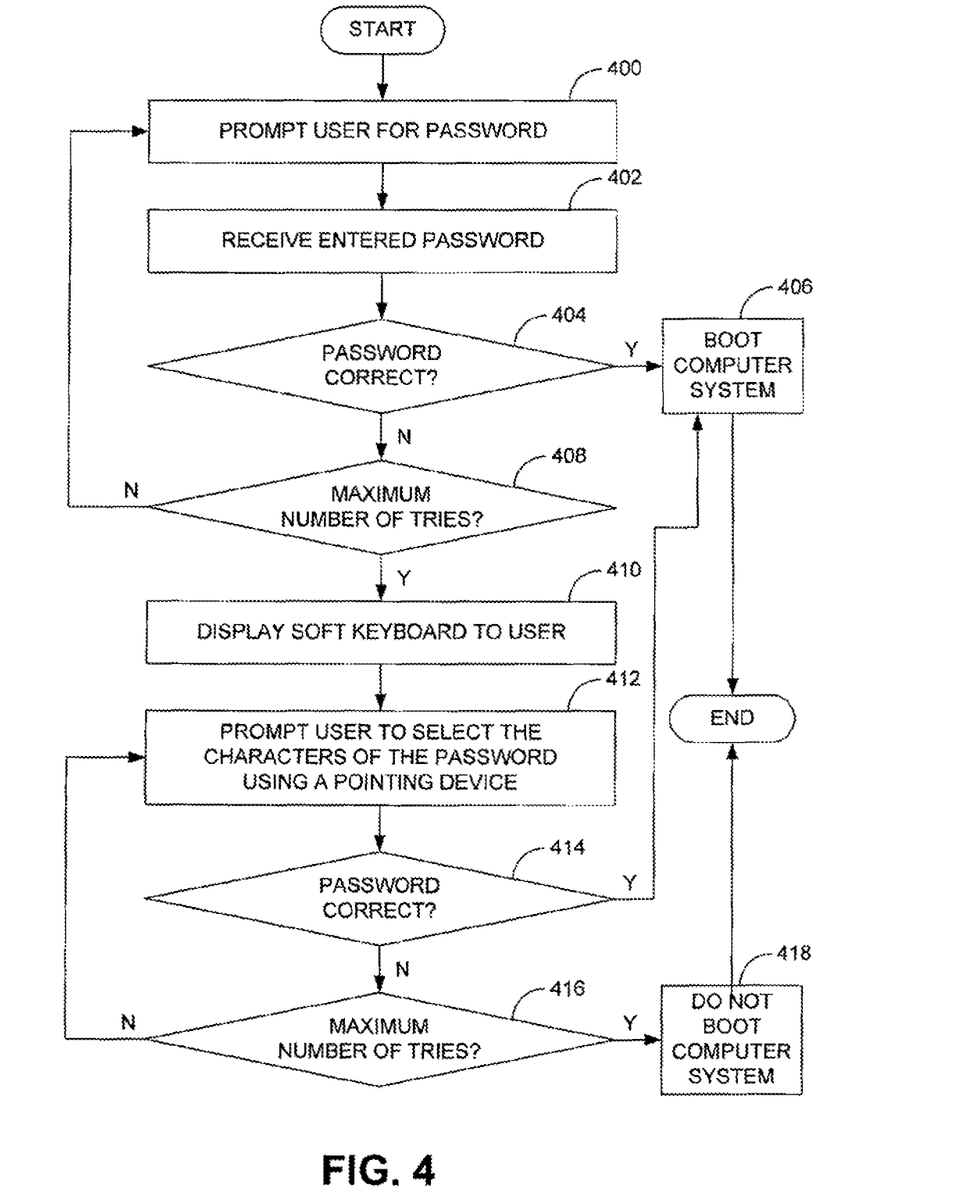
FIG. 4 is a flow diagram that illustrates a second embodiment of operation of the BIOS security manager shown in FIG. 1.

To prevent against such a situation, which can result in a permanently locked system, the BIOS security manager 118 is configured to display a virtual or "soft" keyboard to the user in the computer system display to enable the user to select the characters of his or her password using a pointing device, such as a mouse. In such a situation, mismatch between what the BIOS thinks is the user's keyboard layout and the user's actual keyboard layout would not prevent the user from logging in and using the computer system 100. FIG. 4 provides an example of operation of the BIOS security manager 118 operating in that capacity.

Beginning with block 400 of FIG. 4, the BIOS security manager 118 prompts the user for a password. In particular, the BIOS security manager 118 prompts the user for his or her password after powering of the computer system 100 but prior to booting of the computer system and, therefore, before the operating system 114 is up and running. The entered password is received, as indicated in block 402, and it is determined whether the password is correct (i.e., valid). With reference to decision block 404, if the password is correct, the BIOS 112 boots the computer system 100, as indicated in block 406. If, on the other hand, the password is incorrect (i.e., invalid), flow continues to decision block 408 at which it is determined whether the maximum number of tries has been used. If not, flow returns to block 400 at which the user is again prompted for the password.

If the user fails to enter the correct password after the maximum number of tries (e.g., 3 tries) have been permitted, the BIOS security manager 118 displays a virtual or soft keyboard to the user, as indicated in block 410. The soft keyboard includes a separate displayed "key", for example displayed as an on screen button for each character that can be directly entered using the user's keyboard and layout using one or more of the physical keyboard keys. Therefore, with reference to the English versus French example provided above, the soft keyboard will include a key for "q" that the user can select irrespective of the position of the "q" key on his or her physical keyboard Once the soft keyboard has been displayed, the BIOS security manager 118 can prompt the user to select the various characters of his or her password using a pointing device, as indicated in block 412. By way of example, the pointing device can comprise a mouse. In cases in which the computer system 100 comprises a touch-sensitive screen, the pointing device can comprise a stylus or the user's finger.

Referring next to decision block 414, the BIOS security manager 118 determines whether the password is correct. If not, flow continues to decision block 416 at which it is determined whether the maximum number of tries (e.g., 3 tries) has been used. If not, flow returns to block 412 at which the user is again prompted for the password. If so, the computer system 100 is not booted, as indicated in block 418. Assuming, however, that the user enters the correct password by individually selecting each character of the password using the pointing device, flow continues to block 406 at which the computer system 100 boots.

To enable the functionality described in relation to FIG. 4, the BIOS 112 must be able to display each character of the keyboard layout being used by the user. In other words, the BIOS 112 must be capable of rendering the font glyph of each of those characters, otherwise the character for which there is no font glyph will not pass the verification as a valid character regardless of the keyboard layout. To ensure that the BIOS 112 is capable of such font rendering, the BIOS security manager 118 can also confirm that the BIOS can render each character of a selected password during the processes described in relation of FIGS. 2 and 3.

Various programs (logic) have been described herein. It is noted that those programs can be stored on any computer-readable medium for use by or in connection with any computer-related system or method. In the context of this document, a "computer-readable medium" is an electronic, magnetic, optical, or other physical device or means that contains or stores a computer program for use by or in connection with a computer-related system or method. Those programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

The invention claimed is:

1. A method for supporting pre-boot log in on a computer system, the method comprising:
   receiving a password, via an operating system of the computer system, selected by a user for use in a pre-boot log in;
   determining in an operating state whether the password can be entered by the user in a pre-boot state that is prior to completion of booting of the computer system based on a keyboard layout of a keyboard used when the password was entered via the operating system in comparison to a keyboard layout assumed by a basic input output system (BIOS) used in the pre-boot state; and
   if the password cannot be entered by the user prior to completion of the booting, signaling that the password is unacceptable.

2. The method of claim 1, wherein receiving a password comprises a BIOS of the computer system receiving the password from the operating system of the computer system after the password has been entered by the user in the operating system environment.

3. The method of claim 1, wherein determining comprises determining whether the password can be directly entered using a keyboard.

4. The method of claim 3, wherein determining comprises determining as to each character of the password whether the character can be directly typed using the user's physical keyboard.

5. The method of claim 1, further comprising receiving an identification of a keyboard layout being used by the user and determining whether the keyboard layout is supported by a BIOS of the computer system.

6. The method of claim 5, further comprising signaling that pre-boot log in is not possible using the identified keyboard layout if the keyboard layout is not supported by the BIOS.

7. A non-transitory computer-readable medium that stores a basic input/output system (BIOS) for use on a computer system, the BIOS comprising:
   logic configured to receive a password selected by a user for use in a pre-boot log in;
   logic configured to determine in an operating state whether the password can be entered by the user in a pre-boot state that is prior to completion of booting of the computer system based on a keyboard layout of a keyboard used when the password was entered via the operating system in comparison to a keyboard layout assumed by the BIOS used in the pre-boot state; and logic configured to signal an operating system of the computer system that the password is unacceptable if the password cannot be entered by the user prior to completion of the booting.

8. The non-transitory computer-readable medium of claim 7, wherein the logic configured to determine comprises logic configured to determine as to each character of the password whether the character can be directly typed using the user's physical keyboard.

9. The non-transitory computer-readable medium of claim 7, further comprising logic configured to receive an identification of a keyboard layout being used by the user and to determine whether the keyboard layout is supported by the BIOS.

10. The non-transitory computer-readable medium of claim 9, further comprising logic configured to signal that pre-boot log in is not possible using the identified keyboard layout if the keyboard layout is not supported by BIOS.

11. The non-transitory computer-readable medium of claim 7, further comprising:

logic configured to receive a password entered by a user before the computer system has completed booting;

logic configured to determine whether the password is correct; and logic configured to display a soft keyboard to the user with which the user can select the characters of the user's password if the password is not correct.

12. The non-transitory computer-readable medium of claim 11, further comprising logic configured to receive selections of characters displayed in the soft keyboard input by the user with a pointing device.

13. A computer system comprising:

a processing device;

memory that stores a basic input output system (BIOS) and an operating system, the operating system being configured to:

receive a password selected by a user for use in a pre-boot log in, determine in an operating state whether the password can be entered by the user in a pre-boot state that is prior to completion of booting of the computer system based on a keyboard layout of a keyboard used when the password was entered via the operating system in comparison to a keyboard layout assumed by the BIOS used in the pre-boot state, and signal the operating system of the computer system that the password is unacceptable if the password cannot be entered by the user prior to completion of the booting.

14. The computer system of claim 13, wherein the BIOS is further configured to receive an identification of a keyboard layout being used by the user and to determine whether the keyboard layout is supported by the BIOS.

15. The computer system of claim 13, wherein the BIOS is further configured to receive a password entered by a user before the computer system has completed booting, to determine whether the password is correct, and to display a soft keyboard to the user with which the user can select the characters of the user's password if the password is not correct.

* * * * *